Jan. 5, 1954  H. W. HEIN  2,664,753
VARIABLE CAPACITY MEASURING SCOOP
Filed April 15, 1950  2 Sheets-Sheet 1

INVENTOR
HAROLD W. HEIN

Paul O. Pippel
ATT'Y

Jan. 5, 1954     H. W. HEIN     2,664,753
VARIABLE CAPACITY MEASURING SCOOP
Filed April 15, 1950     2 Sheets-Sheet 2
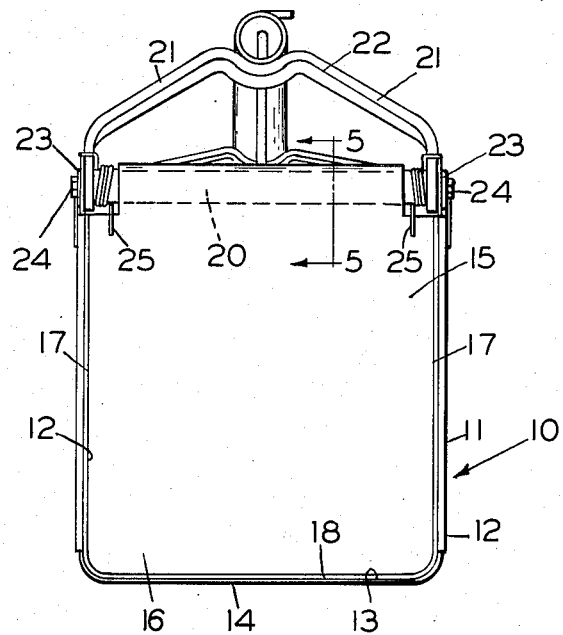
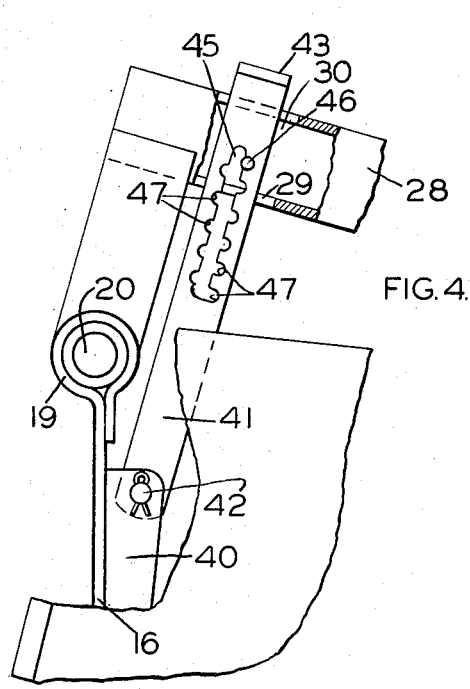
INVENTOR
HAROLD W. HEIN
ATT'Y Patented Jan. 5, 1954

2,664,753

UNITED STATES PATENT OFFICE 2,664,753

VARIABLE CAPACITY MEASURING SCOOP

Harold W. Hein, Chicago, Ill., assignor to International Harvester Company, a corporation of New Jersey Application April 15, 1950, Serial No. 156,132

6 Claims. (Cl. 73—429)

This invention relates to a scoop having an adjustable mechanism whereby the capacity of the scoop may be varied.

It is the prime object of this invention to provide an improved scoop having hand operated means which may be readily adjusted for varying capacity of the scoop. A scoop of this type is especially adaptable for use on the farm and in particular where the feeding program of a herd of animals requires feeding the stock variable quantities of food. In feeding a large herd of animals the biggest chore generally lies in measuring out accurate quantities of feed which might fill the needs of each individual animal. The quantity fed to each animal should be reasonably accurate and thus an effective measuring unit will greatly lighten the feeding tasks of the average farm operator. Applicant has devised a scoop which may be quickly adjusted to a number of different positions by an efficient and accurate quick-operating mechanism.

It is a further object to provide a measuring scoop, the scoop being readily adjustable by the operator by manipulating a mechanism with the same hand which normally grips the scoop during the measuring operation.

A further object is to provide a measuring scoop having a partition adapted to be moved to a number of variable positions thereby varying the capacity of the scoop the partition being movable by a finger tip control, said control also serving to lock the partition in a predetermined position.

These and further objects will become more readily apparent upon a reading of the specification and examination of the accompanying drawings.

In the drawings:

Fig. 3 is a front elevational view of the measuring scoop.

Fig. 4 is a detail enlarged elevational view showing portions of a scoop broken away to illustrate a locking mechanism.

Fig. 5 is a sectional view of a portion of the scoop taken along the line 5—5 of Fig. 3.

Figure 2:
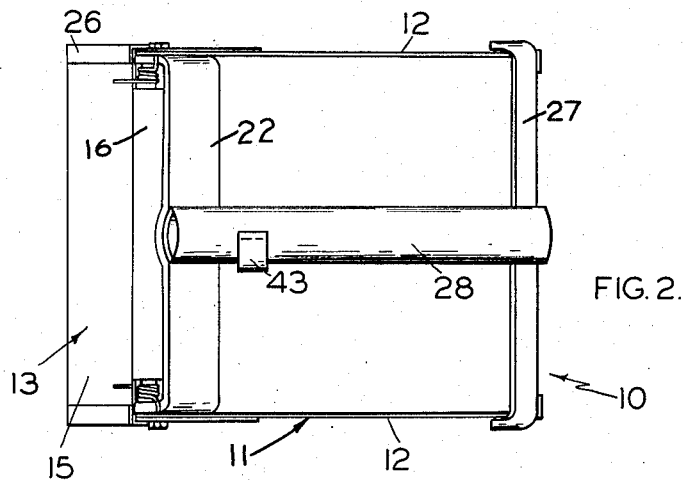
Fig. 2 is a plan view of the scoop shown in Fig. 1.
Figure 1:
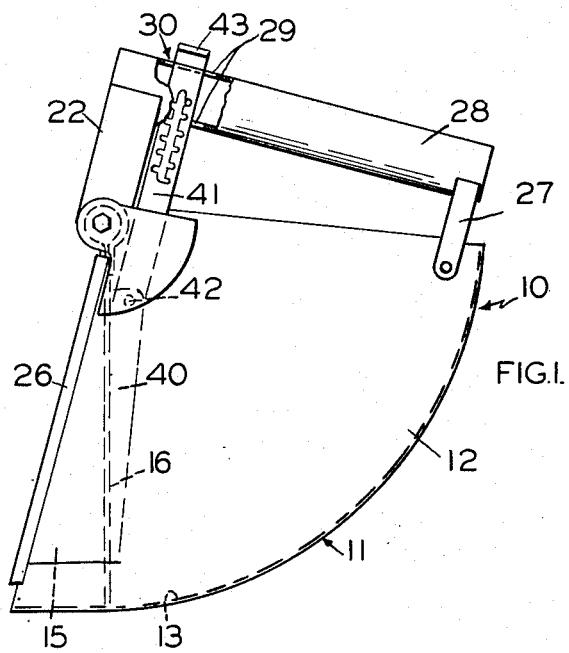
Fig. 1 is a side elevational view of an improved measuring scoop.

Referring particularly to Figs. 1, 2 and 3, a scoop is generally designated by the reference character 10. The scoop comprises a body 11 generally formed with sides or end portions 12 which are connected by an arcuate bottom section 13. The ends 12 and the arcuate bottom 13 may be integrally formed of sheet metal thereby providing a sturdy inexpensive construction. The arcuate bottom 13 is formed at one end with a lip 14 positioned at the front end of a material holding chamber generally designated at 15.

The material holding chamber 15 is provided with a partition or movable rear wall 16 having side edge portions 17 and a lower edge portion 18 positioned in contiguous relation respectively with respect to the ends 12 and the arcuate bottom 13. The upper end of the partition 16 is provided with a cylindrical portion 19 that is journaled on a transversely extending shaft 20. The transversely extending shaft 20 is rigidly secured to oppositely disposed leg portions 21 of a U-shaped front support 22. The ends of the shaft 20 extend through the leg portions 21 and through the ends 12 and are rigidly secured to the body 11 of the scoop 10 by means of washers 23 and nuts 24.

The ends 12 are sector-shaped and the partition 16 extends radially outwardly from the shaft 20, the edges 17 and 18 remaining in contiguous relation with respect to the ends 12 and bottom 13 since the swinging movement of the partition 16 is in an arcuate path. It can readily be seen that by swinging the partition 16 in this manner the capacity of the chamber 15 may be considerably varied. Referring particularly to the disclosure shown in Fig. 1 it can be seen that when the partition 16 is in the position shown the capacity of the chamber 15 is quite limited.

A pair of transversely spaced coil springs 25 are carried by the ends of the shaft 20. The coil springs 25 have portions engaging the front support 22 and the partition 16 so that the springs 25 continuously urge the partition in an upward direction thereby tending to enlarge the capacity of the chamber 15. The partition 16 is arranged to engage angular strips 26, disposed at opposite front edges of the ends 12, which act as stops for limiting the movement of the partition 16 in a forward direction.

A rear U-shaped support 27 is connected to the ends 12 as best shown in Fig. 2. A tubular handle 28 is supported by the U-shaped supports 22 and 27. The tubular handle as best shown in Figs. 1 and 4 has a pair of oppositely disposed apertures 29 which are in registry with each other to provide an opening 30 through the tubular handle 28.

An adjustable locking mechanism for swinging the partition 16 is generally indicated by the reference character 40. The locking mechanism 40 includes a lever 41 which is pivotally connected to the partition 16 as indicated at 42. The lever 41 extends upwardly through the apertures 29 and is provided at its upper end with a finger or thumb engaging portion 43 which projects upwardly through the tubular handle 28. The lever 41 is positioned to move longitudinally through the apertures 29 thereby positioning the partition 16 in a number of pre-determined positions. A slot 45 extends longitudinally in the lever 41, the slot 45 being arranged to receive a pin 46 which is rigidly secured to the tubular handle 28. The slot 45 is closed at its ends and therefore the lever 41 may have limited longitudinal movement, the pin 46 serving to limit the degree of each movement. The lever 41 also includes a plurality of oppositely disposed cut-outs 47. The cut-outs 47 adjoin and are in communication with the slot 45, the oppositely positioned cut-outs 47 being offset in longitudinal relation.

During use the operator grips the tubular handle 28 and swings the partition 16 to a certain position whereby the chamber 15 may hold a pre-determined quantity of material. The springs 25 are continuously urging the partition 16 to swing in an upward direction. By placing the thumb of the gripping hand against the thumb or finger engaging portion 43 the lever 41 may be moved downwardly against the action of the spring and thus the partition 16 may be swung to any desired position. When the partition 16 has been swung to the selected position the operator merely moves the lever 41 with his thumb so that one of the cut-outs 47 engages the pin 46 to lock the lever 41 and the partition 16 in the desired position. The tension exerted by the springs 25 securely locks the lever 41 against movement with respect to the pin 46. It can be seen that the operator may quickly shift the partition 16 to any of the many predetermined or selective positions by merely utilizing the thumb of his gripping hand to engage the portion 43 for shifting the lever 41 into the various positions shown. Since the cut-outs 47 are longitudinally offset with respect to one another and oppositely disposed a large number of locked positions are available. With the locking arrangement shown, shifting of the partition is accomplished with ease and the operator need not utilize his free hand for effecting the shifting. A quick finger-tip or thumb control is thus available.

It must be appreciated that only a preferred embodiment of the invention has been shown and that changes may be made which do not depart from the spirit of the invention nor from the scope thereof as defined in the appended claims.

What is claimed is:

1. A scoop comprising a body having sector shaped ends connected by an arcuate bottom wall, a partition positioned between the sector shaped ends, said partition being connected to the body at one end for pivotal movement about an axis transverse with respect to the ends, said partition extending radially outwardly from the axis and having edge portions in contiguous relation to the bottom wall and the ends, means pivotally moving the partition to a plurality of selective positions thereby varying the material capacity of the scoop, including a spring engaging the partition and the body for continuously urging the partition to pivot in one direction, a manual control lever pivotally connected to the partition, the control lever being movable to pivot said partition against the action of said spring, and locking means between said control lever and said body for securing the partition in one of the selective positions.

2. In a scoop including a body having sector shaped ends and an arcuate bottom connecting the ends, means for varying the material capacity of the scoop comprising a partition connected to the body for pivotal movement about an axis transverse with respect to said ends, the partition extending radially outwardly from the axis and having edge portions in contiguous relation to the ends and the bottom, a tubular handle connected to the body above the partition, said handle having apertures in registry to provide an opening through the handle, means for moving the partition to a plurality of selective positions within the scoop, including a spring engaging the partition and the body for continuously urging the partition to pivot in one direction, a control lever pivotally connected to the partition, said control lever extending through the opening in said handle and having a manual control portion projecting outwardly from the handle, said lever having a longitudinally extending slot, a pin on said handle engaged by said slot, and a plurality of oppositely disposed and longitudinally off-set cut-outs in said lever adjoining said slot, each cut-out being adapted to engage the pin during relative longitudinal movement of the lever for securing the lever and the partition in one of a pluraltiy of selective positions.

3. A scoop comprising a body for holding material, the body having spaced sector shaped ends connected by an arcuate bottom wall, a partition extending transversely between the ends, and having edges in contiguous relation to the ends and the bottom, means pivotally connecting the partition to the body for swinging movement whereby the material holding capacity of the body may be varied, resilient means connected to the partition for urging said partition in one direction, means for swinging the partition to a plurality of selective positions and against the action of said resilient means including a manually operable lever pivotally connected to the partition, a handle connected to said body, and a hand operable control portion on the lever, the control portion being positioned within finger tip reach adjacent to the handle whereby an operator gripping said handle, can with the gripping hand, move the control portion and adjust the position of said partition.

4. In a scoop including a material holding body having ends connected by an arcuate bottom, means for varying the material capacity of the body comprising a portion connected to the body for pivotal movement about an axis transverse with respect to said ends, the partition extending radially outwardly from the axis and having edge portions in contiguous relation to the ends and the bottom, a handle connected to the body above the partition, said handle having an opening therethrough, means for moving the partition to a plurality of selective positions within the scoop, including a spring engaging the partition and the body for continuously urging the partition to pivot in one direction, a control lever pivotally connected to the partition, said control lever extending through the opening in said handle and having a manual control portion projecting outwardly from the handle, said lever having a longitudinally extending slot, a pin on said handle engaged by said slot, and a plurality of oppositely disposed and longitudinally off-set cut-outs in said lever adjoining said slot, each cut-out being adapted to engage the pin during relative longitudinal movement of the lever for securing the lever and the partition in one of the selective positions.

5. In a scoop including a body having sector shaped ends connected by an arcuate bottom wall, a partition positioned within the body, the partition having edges normally contiguous to the ends and the bottom to provide in said body a material holding chamber, means pivotally connecting the partition to said body for swinging movement about a transverse axis whereby the material holding capacity of the chamber may be varied, a handle on said body above said partition, a spring engaging the partition for continually urging said partition to swing in one direction, means for swinging the partition to a plurality of predetermined positions comprising a lever pivotally connected to the partition, means for locking the lever in any one of the positions including a pin connected to said handle, adjustable locking means on said lever including a closed end slot longitudinally formed in said lever and engaging the pin to permit limited sliding movement of said lever with respect to said pin, said lever including a plurality of cut-outs adjoining said slot, each cut-out being arranged to receive the pin for locking said lever and said partition in one of the predetermined portions.

6. In a scoop including a material holding body having ends connected by an arcuate bottom, means for varying the material capacity of the body comprising a portion connected to the body for pivotal movement about an axis transverse with respect to said ends, the partition extending radially outwardly from the axis and having edge portions in contiguous relation to the ends and the bottom, a handle connected to the body above the partition, said handle having an opening therethrough, means for moving the partition to a plurality of selective positions within the scoop, including a control lever pivotally connected to the partition, said control lever extending through the opening in said handle and having a manual control portion projecting outwardly from the handle, said lever having a longitudinally extending slot, a pin on said handle engaged by said slot, and a plurality of cut-outs in said lever adjoining said slot, each cut-out being adapted to engage the pin during relative longitudinal movement of the lever for securing the lever and the partition in one of the selective positions.

HAROLD W. HEIN.

References Cited in the file of this patent

UNITED STATES PATENTS

| Number | Name | Date |
|---|---|---|
| 422,243 | Moulton et al. | Feb. 25, 1890 |
| 1,074,474 | Skyum | Sept. 30, 1913 |
| 2,313,213 | Atherley | Mar. 9, 1943 |

FOREIGN PATENTS

| Number | Country | Date |
|---|---|---|
| 18,102 | Sweden | Aug. 17, 1903 |